J. McWILLIAMS.
Jewelers' Hand-Presses.

No. 143,023. Patented September 23, 1873.

WITNESSES.
S. Scholfield,
John S. Coggeshall

John McWilliams

UNITED STATES PATENT OFFICE.

JOHN McWILLIAMS, OF PROVIDENCE, RHODE ISLAND.

IMPROVEMENT IN JEWELER'S HAND-PRESSES.

Specification forming part of Letters Patent No. 143,023, dated September 23, 1873; application filed May 13, 1873.

*To all whom it may concern:*

Be it known that I, JOHN McWILLIAMS, of Providence, in the county of Providence and State of Rhode Island, have invented an Improvement in Jeweler's Hand-Presses, of which the following is a full and exact description, reference being had to the accompanying drawing making a part of this specification.

The nature of my invention consists in a device for taking up the back-lash resulting from wear between the plunger and the end of the screw; and also in an adjustable gage or stop for limiting and controlling the downward movement of the plunger, as desired.

Figure 1:
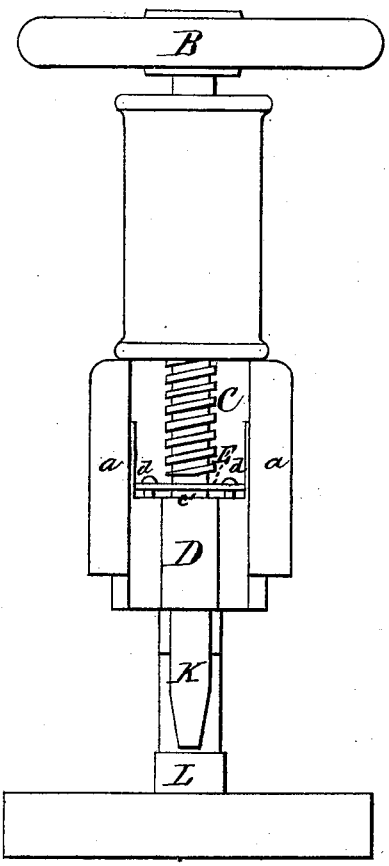
Figure 2:
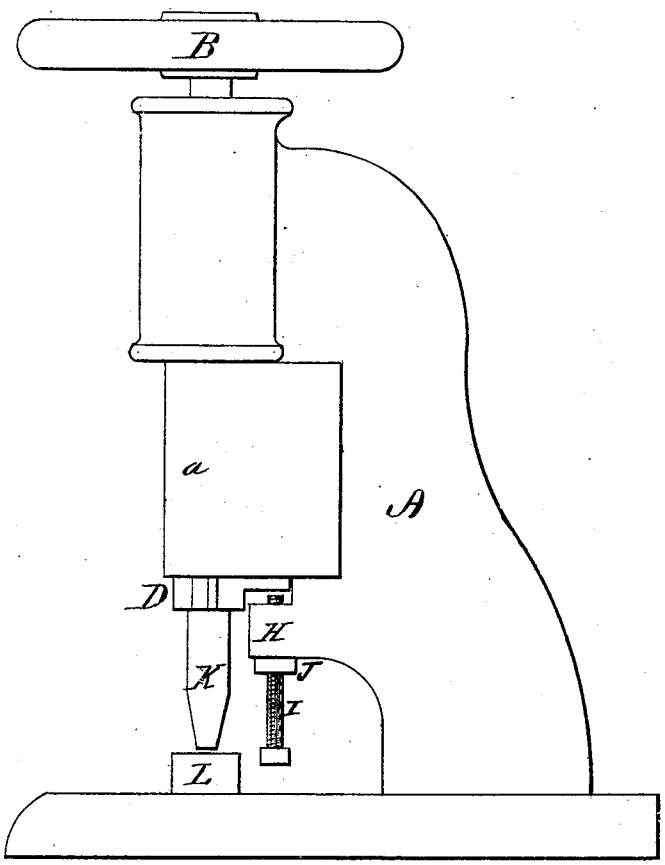
Figure 3:
Figure 4:
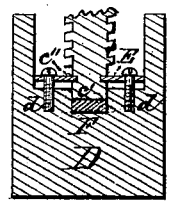

Figure 1 is a front elevation of the press. Fig. 2 is a side elevation. Fig. 3 is a top view of the plate used to connect the screw to the plunger. Fig. 4 is a sectional view, showing the manner of connecting the screw to the plunger.

In the drawing, A is the frame of the press; B, a hand-wheel, by means of which the screw C is operated. The screw C may be made four-threaded, in order to impart to the plunger D a rapid movement. Upon the lower end of the screw C is turned the collar $c'$, and a groove or neck, $c''$, arranged to receive the retaining-plate E, which is cut out upon one side, as shown in Fig. 3, and which is secured to the plunger D by means of the two screws $d\ d$. Under the end of the screw C is placed the hardened friction piece F. The back-lash, caused by continued wear, may be readily taken up by turning the screws $d\ d$ in the proper direction.

In certain devices heretofore employed to connect the screw and plunger, a difficulty is experienced whenever the slides $a\ a$ in which the plunger moves become worn so as to require setting up, the screw in this case becoming cramped and bound by the changed line of the plunger; whereas by the employment of the improved device here shown this trouble may be avoided, the proper amount of side play being readily secured by making the end of the screw C and the hole in the plunger D and plate E of the proper relative size.

Upon the frame A is cast the lug H, tapped out to receive the adjusting-screw I, operating as a stop to the plunger D. The screw I is to be held in its proper position by means of the check-nut J.

In the use of jeweler's hand-presses, as ordinarily constructed, there is great liability to injure the dies by forcing them together too hard, and the object of my improvement is to remove this difficulty by furnishing an adjustable stop, whereby the movement of the male die may be controlled, as desired. I am also enabled to strike up each piece of stock to a uniform thickness, which, in many cases, is very desirable.

I claim as my invention—

1. The combination of the screw C, collar $c'$, plate E, screws $d\ d$, and plunger D, substantially as described.

2. The combination of the hand-wheel B, many-threaded screw C, sliding plunger D, lug H, adjusting-screw I, and male and female dies, the whole operating substantially as described.

JOHN McWILLIAMS.

Witnesses:
S. SCHOLFIELD,
THOMAS DEVINE.